(12) United States Patent
Gu et al.

(10) Patent No.: US 9,874,446 B2
(45) Date of Patent: Jan. 23, 2018

(54) PHYSICAL UNIT OF CHIP-SCALE NMR GYROSCOPE

(71) Applicant: WUHAN INSTITUTE OF PHYSICS AND MATHEMATICS, CHINESE ACADEMY OF SCIENCES, Wuhan (CN)

(72) Inventors: Sihong Gu, Wuhan (CN); Yi Zhang, Wuhan (CN); Jiehua Chen, Wuhan (CN); Hongwei Wu, Wuhan (CN); Yuanchao Wang, Wuhan (CN)

(73) Assignee: WUHAN INSTITUTE OF PHYSICS AND MATHEMATICS, CHINESE ACADEMY OF SCIENCES, Wuhan (CN)

( * ) Notice: Subject to any disclaimer, the term of this patent is extended or adjusted under 35 U.S.C. 154(b) by 461 days.

(21) Appl. No.: 14/692,773

(22) Filed: Apr. 22, 2015

(65) Prior Publication Data

US 2016/0010995 A1    Jan. 14, 2016

(30) Foreign Application Priority Data

Jul. 8, 2014   (CN) .......................... 2014 1 0322514

(51) Int. Cl.
  *G01C 19/62*      (2006.01)
(52) U.S. Cl.
  CPC .................................. *G01C 19/62* (2013.01)

(58) Field of Classification Search
  CPC ........ G01C 19/58–19/62; G01R 33/20–33/26; G01N 24/00–24/10
  USPC .................................................. 324/300–339
  See application file for complete search history.

(56) References Cited

U.S. PATENT DOCUMENTS

2014/0361768 A1* 12/2014 Overstreet, II ........ G01C 19/62
                                                                         324/304

* cited by examiner

*Primary Examiner* — Melissa Koval
*Assistant Examiner* — Rahul Maini
(74) *Attorney, Agent, or Firm* — Matthias Scholl P.C.; Matthias Scholl

(57) ABSTRACT

A physical unit of a chip-scale nuclear magnetic resonance (NMR) gyroscope, the physical unit including: a vertical cavity surface emitting laser (VCSEL), a silicon sheet including a recess, a glass sheet, an atomic vapor chamber, a first right angle prism, a quarter-wave plate, a polarizing beam splitter, and photodetectors. The recess includes sides including reflecting mirrors. The glass sheet is disposed on the silicon sheet. The recess of the silicon sheet is in a structure of an inverted square frustum, and the reflecting mirrors are disposed on sides of the recess. The atomic vapor chamber is an enclosed region formed between the recess and the glass sheet. The atomic vapor chamber is filled with alkali metal atoms, one or a plurality of inert gas atoms, and one or a plurality of buffer gases.

10 Claims, 5 Drawing Sheets

PHYSICAL UNIT OF CHIP-SCALE NMR GYROSCOPE

CROSS-REFERENCE TO RELATED APPLICATIONS

Pursuant to 35 U.S.C. §119 and the Paris Convention Treaty, this application claims the benefit of Chinese Patent Application No. 201410322514.9 filed Jul. 8, 2014, the contents of which are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND OF THE INVENTION

Field of the Invention

The invention relates to the field of atomic sensors, and more particularly to a physical unit of a chip-scale nuclear magnetic resonance (NMR) gyroscope.

Description of the Related Art

A typical NMR gyroscope includes a physical unit and an electric unit. The physical unit includes: an optical source, optical elements, an atomic vapor chamber, and photodetectors. The physical system of the chip-scale NMR gyroscope is achieved by a micro electro mechanical system (MEMS) processing. However, MEMS suffers from the following problems: 1) The atomic vapor chamber of the MEMS generally adopts a glass-silicon-glass sandwich structure, but the pump light beam and the probe light beam are difficult to orient orthogonally in the light-atom interaction region. 2) The two light beams are provided by two independent semiconductor lasers, and temperatures, frequencies of the output laser beams, and the powers of the two lasers are separately controlled, thereby resulting in large resource consumption; besides performances of the two light beams change independently, resulting in in difficulties in cooperation of the two light beams under working conditions. 3) Although in some atomic vapor chambers of the MEMS adopting the glass-silicon-glass sandwich structure, the pump light beam and the probe light beam are orthogonal to each other within the light-atom interaction region, it is difficult to couple the light into the atomic vapor chamber.

SUMMARY OF THE INVENTION

In view of the above-described problems, it is one objective of the invention to provide a physical unit of a chip-scale nuclear magnetic resonance (NMR) gyroscope that has simple structure, convenient and wide application, low production cost, and good coherence of two lights and that is adapted to overcome difficulty for realizing two orthogonal beams in the atomic vapor chamber in the present chip-scale NMR gyroscope, improve the quality of the NMR signal, and increase the accuracy of the chip-scale NMR gyroscope.

To achieve the above objective, in accordance with one embodiment of the invention, there is provided a physical unit of a chip-scale nuclear magnetic resonance (NMR) gyroscope. The physical unit comprises: a vertical cavity surface emitting laser (VCSEL); a silicon sheet comprising a recess, the recess comprising sides comprising reflecting mirrors; a glass sheet; an atomic vapor chamber; a first right angle prism; a quarter-wave plate; a polarizing beam splitter; and photodetectors. The glass sheet is disposed on the silicon sheet. The recess of the silicon sheet is in a structure of an inverted square frustum, and the reflecting mirrors are disposed on sides of the recess. The atomic vapor chamber is an enclosed region formed between the recess and the glass sheet. The atomic vapor chamber is filled with alkali metal atoms, one or a plurality of inert gas atoms, and one or a plurality of buffer gases. A laser beam is transmitted from the VCSEL and is divided into a reflection beam and a transmission beam when passing through the first right angle prism. The reflection beam is reflected by a first reflecting mirror into the atomic vapor chamber as a probe light beam and interacts with the atoms therein. The transmission beam passes through the quarter-wave plate and is reflected by a second reflecting mirror into the atomic vapor chamber as a pump light beam and interacts with the atoms therein. The pump light beam and the probe light beam are orthogonal to each other within the atomic vapor chamber. The probe light beam after interacting with the atoms is reflected by a third reflecting mirror and is divided by the polarizing beam splitter into two beams, and the two beams are detected by the photodetectors, respectively.

In a class of this embodiment, the reflecting mirrors disposed on the sides of the recess comprise: the first reflecting mirror, the second reflecting mirror, and the third reflecting mirror arranged on three sides of the recess, respectively. The VCSEL is disposed on a laser base and the laser base is disposed on the glass sheet. The transmission beam of the first right angle prism passes through the quarter-wave plate whereby being converted into a circularly polarized beam; the circularly polarized beam is reflected by a second right angle prism onto the first reflecting mirror, and the circularly polarized beam after being reflected by the first reflecting mirror serves as the pump light beam. The reflection beam of the first right angle prism is reflected by a third right angle prism onto the second reflecting mirror, and a linearly polarized beam is reflected by the second reflecting mirror into the atomic vapor chamber as the probe light beam. The probe light beam after being orthogonal to the pump light beam is reflected by a third reflecting mirror into the polarizing beam splitter. An incident light is divided by the polarizing beam splitter into two beams, one beam is detected by a first photodetector and the other beam is detected by a second photodetector.

In a class of this embodiment, a convex lens is disposed between the VCSEL and the first right angle prism, and the VCSEL is disposed at a focus of the convex lens.

In a class of this embodiment, an intensity of the transmission beam of the first right angle prism accounts for between 85% and 95% of an intensity of an incident light thereof.

In a class of this embodiment, a diameter of the pump light beam corresponds with a depth of the recess; and a diameter of the probe light beam corresponds with the depth of the recess.

In a class of this embodiment, a polarization direction of the linearly polarized beam of the VCSEL is in parallel to the glass sheet. An angle between an optical axis of the quarter-wave plate and a polarization direction of an incident light beam is 45°. Interior angles of the second right angle prism are 35.26°, 54.74°, and 90°, respectively. Interior angles of the third right angle prism are 35.26°, 54.74°, and 90°, respectively. An angle between each of the three sides of the recess and the glass sheet is 54.74°. In both the second right angle prism and the third right angle prism, angles between reflection surfaces and the glass sheet are 35.26°, and angles between normal directions of the reflection surfaces and incident directions of incident light beams are 54.74°.

In a class of this embodiment, the silicon sheet is a <100> crystallographic orientation silicon sheet, and the sides of the recess are obtained by anisotropic wet etching.

In a class of this embodiment, the first reflecting mirror, the second reflecting mirror, and the third reflecting mirror are all single-layer metal reflecting films or multi-layer dielectric reflecting films.

In a class of this embodiment, a surface of the silicon sheet is adhered to the glass sheet by anodic bonding process.

In a class of this embodiment, an angle between the incident light of the polarizing beam splitter and a splitting surface of the polarizing beam splitter is 45°, and the two emergent beams after beam splitting are perpendicular to the first photodetector and the second photodetector, respectively.

Advantages according to embodiments of the invention are summarized as follows:

As described above, the pump light beam and the probe light beam of the invention are produced by the same laser. The physical system of the invention has low production cost, easy realization, and excellent coherence of the two light beams. The reflection of the sides of the recess of the atomic vapor chamber enables the pump light beam and the probe light beam to be orthogonal to each other in the atomic vapor chamber, thereby overcoming the difficulty for the current chip-scale NMR gyroscope to realize the two orthogonal light beams in the atomic vapor chamber. The recess of the silicon sheet is acquired by wet etching. Compared with dry etching, the wet etching is prone to increase the depth of the recess of the silicon sheet, so that it is convenient to increase the depth, enlarge the faculae, and enlarge the volume for light-atom interaction according to the requirement, thereby improving the quality of NMR signals, and increasing the accuracy of the NMR gyroscope.

BRIEF DESCRIPTION OF THE DRAWINGS

The invention is described hereinbelow with reference to the accompanying drawings, in which.

Figure 1:
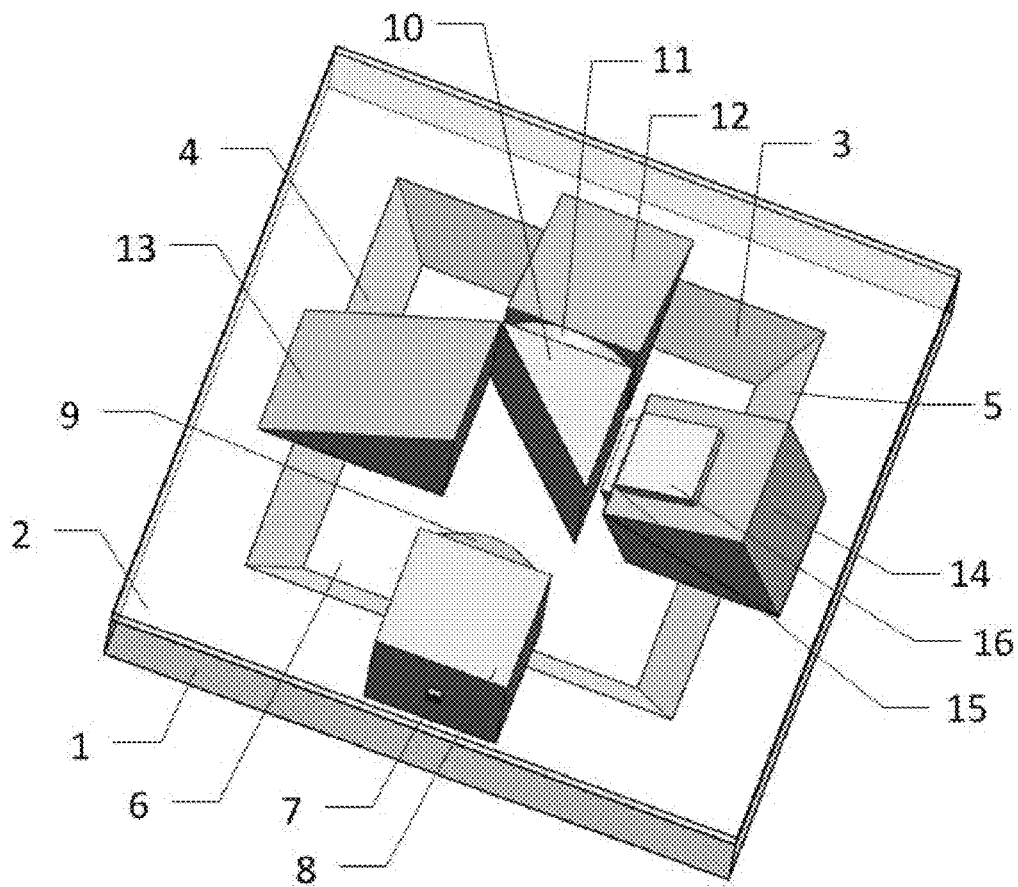
FIG. 1 is a stereogram of a physical unit of a chip-scale NMR gyroscope in accordance with one embodiment of the invention.

In the drawings, the following reference numbers are used: 1. Silicon sheet comprising recess; 2. Glass sheet; 3. First reflecting mirror; 4. Second reflecting mirror; 5. Third reflecting mirror; 6. Atomic vapor chamber; 7. VCSEL; 8. Laser base; 9. Convex lens; 10. First right angle prism; 11. Quarter-wave plate; 12. Second right angle prism; 13. Third right angle prism; 14. Polarizing beam splitter; 15. First photodetector; and 16. Second photodetector.

DETAILED DESCRIPTION OF THE EMBODIMENTS

For further illustrating the invention, experiments detailing physical unit of a chip-scale NMR gyroscope are described below. It should be noted that the following examples are intended to describe and not to limit the invention.

As shown in FIG. 1, a physical unit of a chip-scale NMR gyroscope comprises: a silicon sheet 1 comprising a recess, a glass sheet 2, a first reflecting mirror 3 of the recess, a second reflecting mirror 4 of the recess, and a third reflecting mirror 5 of the recess, an atomic vapor chamber 6, a VCSEL 7, a laser base 8, a convex lens 9, a first right angle prism 10, a quarter-wave plate 11, a second right angle prism 12, a third right angle prism 13, an polarizing beam splitter 14, a first photo detector 15, and a second photodetector 16. Connection relations are as follows: the recess of the silicon sheet 1 is obtained by wet etching the silicon sheet 1, a <100> crystallographic orientation silicon sheet is immersed in a KOH solution for conducting anisotropic corrosion, and self-corrosion is stopped at a (111) crystal surface, so that sides of the recess are formed with an angle between each side and a surface of the silicon sheet of 54.74°. A single-layer reflecting metal film or a multi-layer reflecting dielectric film is coated on each side of the recess for realizing the reflecting mirror. For example, the side not required for coating is pre-coated with an organic film, the recess is then coated with a single-layer gold film using hard mask sputtering TiW/Au, and finally the organic film is stripped, so that the gold film reflecting mirrors are formed on the sides to be coated. In conditions of adopting the multi-layer dielectric film, the $Ta_2O_5/SiO_2$ multi-layer dielectric film is coated using the electron beam evaporation method. The dielectric film deposited on the side not required for coating is removed by chemical mechanical polishing, so that the multi-layer dielectric film reflecting mirror is realized on the sides required for coating. The same method is used to realize the first reflecting mirror 3, the second reflecting mirror 4, and the third reflecting mirror 5. The silicon sheet 1 and the glass sheet 2 are adhered to each other by anodic bonding process. The atomic vapor chamber 6 is an enclosed region formed by the silicon sheet 1 and the glass sheet 2. The atomic vapor chamber 6 is filled with alkali metal atoms (such as rubidium 87, cesium 133), inert gas atoms (such as two gases selected from xenon 129, xenon 131, helium 3, and inert gases of equivalent effects), and buffer gases (such as nitrogen gas, methane gas, and gases of equivalent effects).

Figure 2:
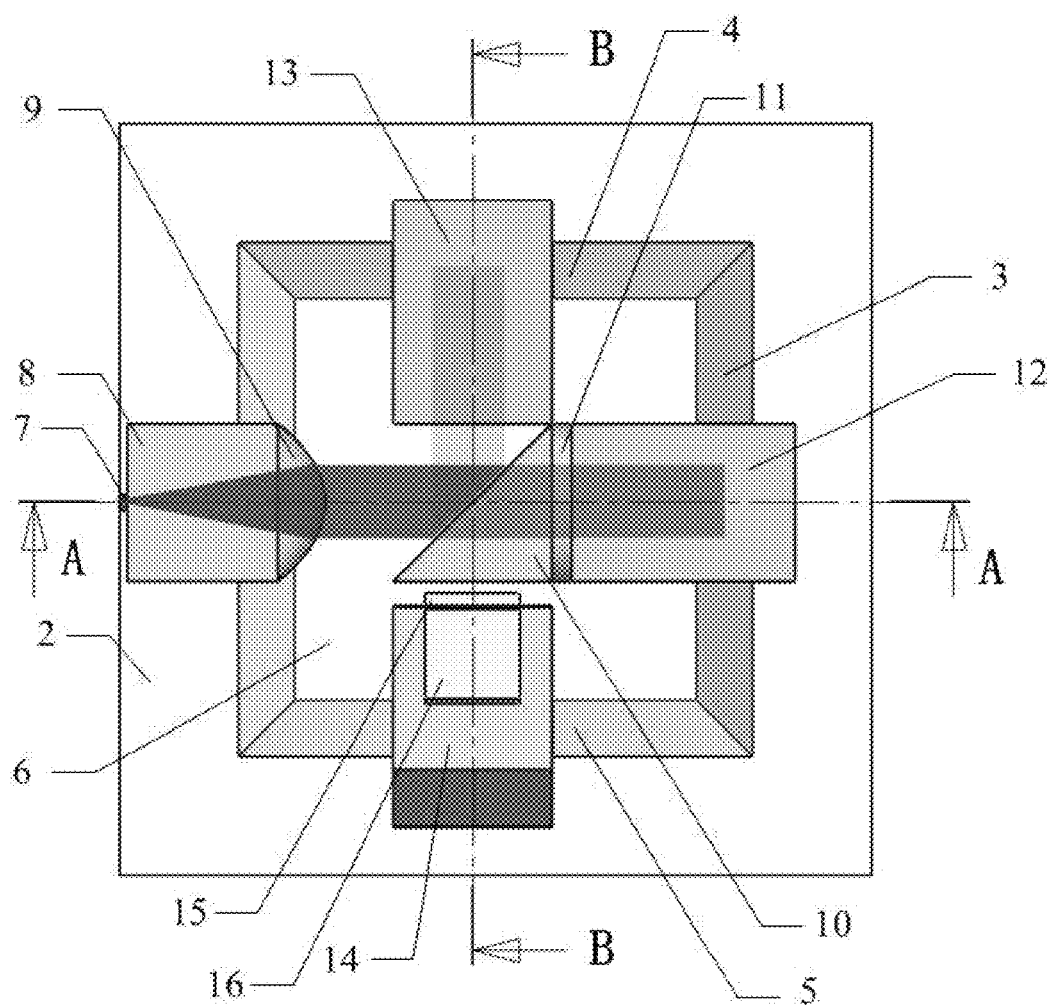
FIG. 2 is a top view of a physical unit of a chip-scale NMR gyroscope in accordance with one embodiment of the invention.

FIG. 2 is a top view of the physical unit of a chip-scale NMR gyroscope. As shown in FIG. 2, the VCSEL 7 provides a linearly polarized light beam. The VCSEL 7 is mounted on the laser base 8, and a polarization direction of an emergent light thereof is in parallel to a surface of the glass sheet. The laser base 8, the convex lens 9, and the first right angle prism 10 serving as a partial reflecting mirror are arranged in a transmission direction of the emergent light, in which, a focus of the convex lens 9 coincides with the position of the VCSEL, and a focal distance satisfies that the light beam is converted into a parallel beam having a diameter equivalent to a depth of the recess. The first right angle prism 10 divides the incident beam with the polarization direction in parallel to the surface of the glass sheet into a first transmission beam and a first reflection beam with an intensity ratio of approximately 92:8. The quarter-wave plate 11, the second right angle prism 12 serving as a first total reflecting mirror (having interior angles of 35.26°, 54.74°, and 90°) are arranged in a transmission direction of the first transmission beam. A linearly polarized transmission beam is converted into a circularly polarized beam by the quarter-wave plate 11. The circularly polarized beam is then reflected by the second right angle prism 12, passes through the glass sheet 2 to enter the atomic vapor chamber, and is further reflected by the first reflecting mirror 3 and interacts with the atoms. The third right angle prism 13 (having interior angles of 35.26°, 54.74°, and 90°) serving as a second total reflecting mirror is disposed on a transmission direction of the first reflection beam. The linearly polarized transmission beam is reflected by the third right angle prism 13 into the atomic vapor chamber and then reflected by a second reflecting mirror 4, interacts with the atoms, and is further reflected by the third reflecting mirror 5. The linearly polarized beam is emergent from the atomic vapor chamber via a glass window and enters a polarization beam splitting prism. The incident beam of the polarization beam splitting prism is divided into a second reflection beam and a second transmission beam of different polarization features. The second reflection beam and the second transmission beam are detected by the first photodetector 15 and the second photodetector 16, respectively.

Figure 3A:
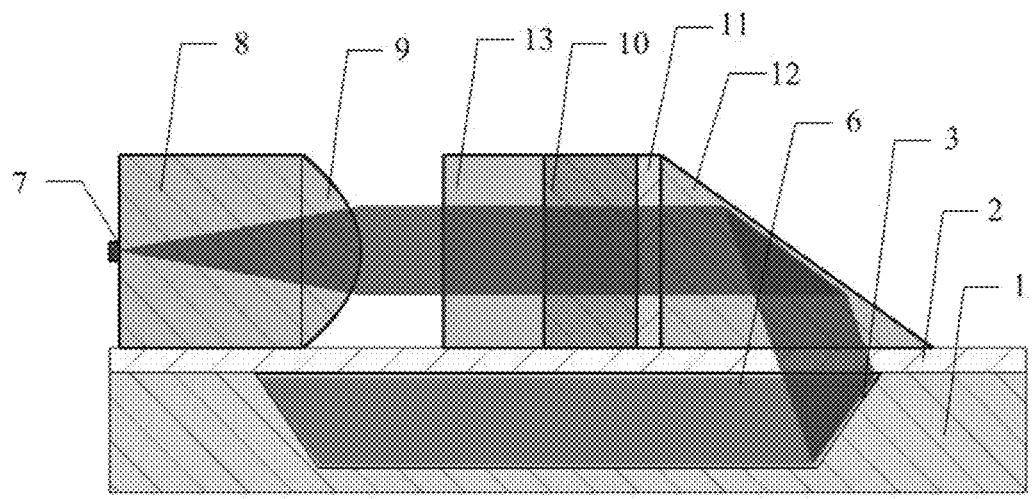
FIG. 3A is a cross sectional view of line A-A of FIG. 2 showing transmission of a beam.
Figure 3B:
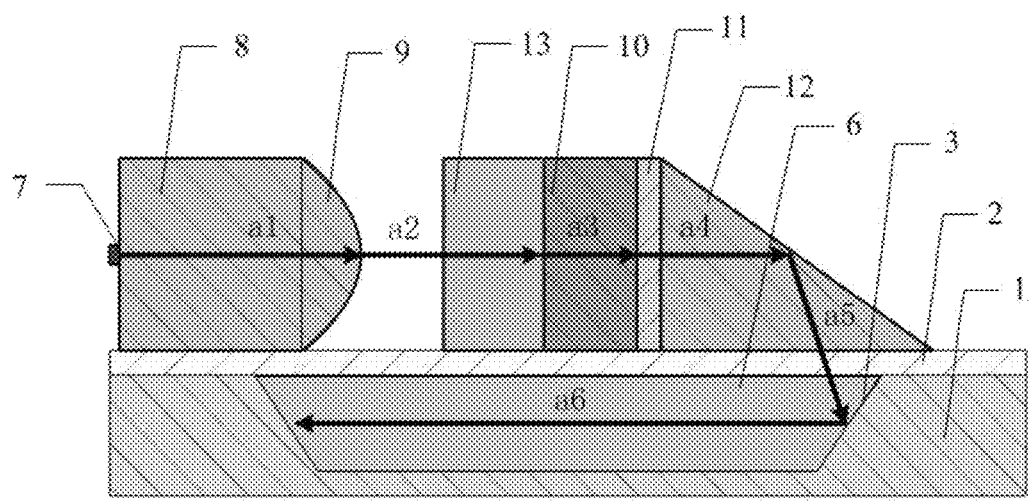
FIG. 3B is a cross sectional view of line A-A of FIG. 2 marking transmission of a beam.

FIGS. 3A-3B are cross sectional views of A-A of FIG. 2 showing a light beam and a marking thereof. A divergent linearly polarized light beam a1 is converted by the convex lens 9 into a parallel beam a2 which then passes through the first right angle prism 10 and 92% of the intensity of the beam is transmitted to form the first transmission beam a3. The first transmission beam a3 (linearly polarizing beam) is then converted into the circularly polarized beam a4 by the quarter-wave plate 11. The circularly polarized beam a4 is totally reflected by the second right angle prism 12 to produce a light beam a5. The light beam a5 enters the atomic vapor chamber and is reflected by the first reflecting mirror 3 to produce a light beam a6 serving as a pump light beam. The pump light beam a6 interacts with the alkali metal atoms in the atomic vapor chamber 6 thereby polarizing the alkali metal atoms. The inert gas is further polarized by the polarized alkali metal atoms under the coupling effect.

Figure 4A:
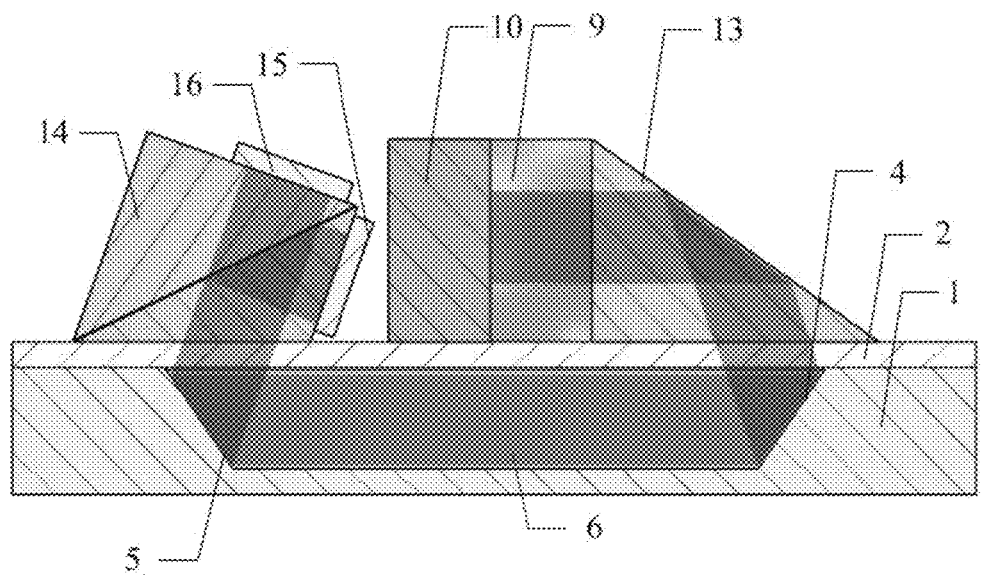
FIG. 4A is a cross sectional view of line B-B of FIG. 2 showing transmission of a beam.
Figure 4B:
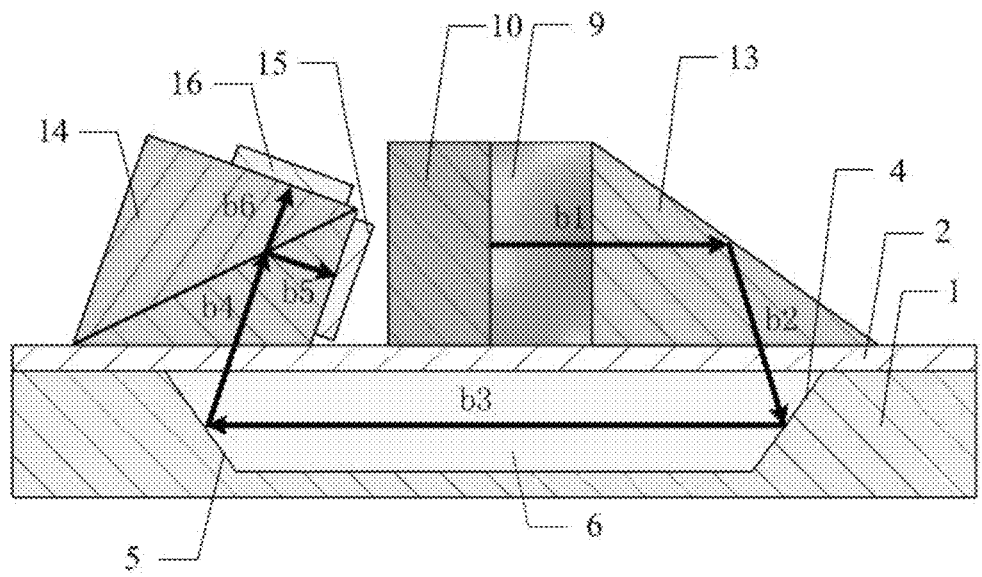
FIG. 4B is a cross sectional view of line B-B of FIG. 2 marking transmission of a beam.
Figure 5:
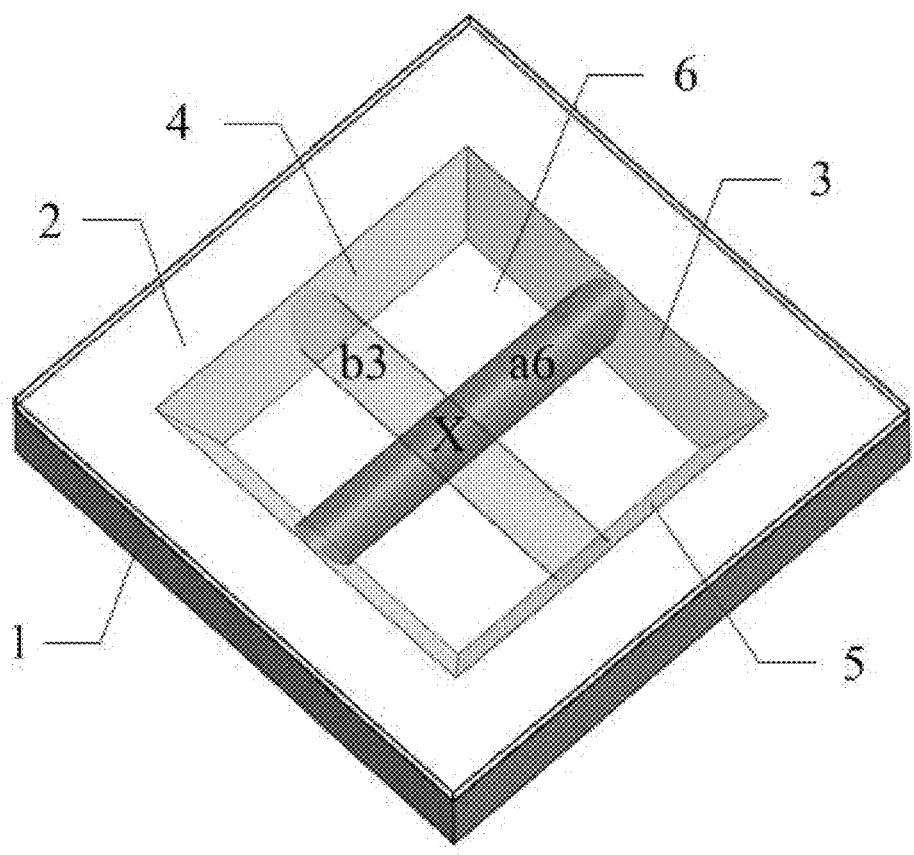
FIG. 5 is a diagram showing a pump beam and a probe beam orthogonal to each other in an atomic vapor chamber.

FIGS. 4A-4B are cross sectional views of line A-A of FIG. 2 showing a light beam and a marking thereof. The parallel beam a2 of FIG. 3B enters the first right angle prism 10 and a light beam having an intensity accounting for 8% of that of the parallel beam a2 is reflected to form the first reflection beam b1. The first reflection beam b1 is totally reflected by the third right angle prism 13 to form a light beam b2, the light beam b2 enters the atomic vapor chamber and is reflected by the second reflecting mirror 4 to form the probe light beam b3. The probe light beam b3 having a polarization direction in parallel to the surface of the glass sheet 2 and the pump light beam a6 are orthogonal to each other within a region X of FIG. 5 in the atomic vapor chamber. After the Faraday magneto-optical rotation effect interacts with the atoms, the polarization direction of the probe light beam b3 changes, the probe light beam b3 is reflected by the third reflecting mirror 5 to produce a light beam b4. The light beam b4 is divided by the polarizing beam splitter 14 into two light beams, in which a second reflection beam b5 formed by a light component keeping in the polarization direction in parallel to the surface of the glass sheet 2 is detected by the first photodetector 15, and a second transmission beam b6 formed by a light component having a polarization direction perpendicular to that of the reflection beam b5 is detected by the second photodetector 16.

As described above, the pump light beam and the probe light beam of the invention are produced by the same laser. The physical system of the invention has low production cost, easy realization, and good coherence of two light beams. The reflection of the sides of the recess of the atomic vapor chamber enables the pump light beam and the probe light beam to be orthogonal to each other in the atomic vapor chamber, thereby overcoming the difficulty for the chip-scale NMR gyroscope to realize the two orthogonal beams in the atomic vapor chamber. The wet etching method is prone to increase the depth of the recess of the silicon sheet, so that it is convenient to increase the depth, enlarge the faculae, and enlarge the volume for light-atom interaction according to the requirement, thereby improving the quality of NMR signals. Besides, the elements and structures of the unit of the invention are applicable for integration and realizing the chip-scale physical system.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A physical unit of a chip-scale nuclear magnetic resonance (NMR) gyroscope, the physical unit comprising:
   a) a vertical cavity surface emitting laser (VCSEL);
   b) a silicon sheet comprising a recess, the recess comprising sides comprising reflecting mirrors;
   c) a glass sheet;
   d) an atomic vapor chamber;
   e) a first right angle prism;
   f) a quarter-wave plate;
   g) a polarizing beam splitter; and
   h) photodetectors;
wherein:
   the glass sheet is disposed on the silicon sheet;
   the recess of the silicon sheet is in a structure of an inverted square frustum, and the reflecting mirrors are disposed on sides of the recess; and
   the atomic vapor chamber is an enclosed region formed between the recess and the glass sheet; and
when in use:
   the atomic vapor chamber is filled with alkali metal atoms, one or a plurality of inert gas atoms, and one or a plurality of buffer gases;
   a laser beam is transmitted from the VCSEL and is divided into a reflection beam and a transmission beam when passing through the first right angle prism;
   the reflection beam is reflected by a first reflecting mirror into the atomic vapor chamber as a probe light beam and interacts with the atoms therein;
   the transmission beam passes through the quarter-wave plate and is reflected by a second reflecting mirror into the atomic vapor chamber as a pump light beam and interacts with the atoms therein;
   the pump light beam and the probe light beam are orthogonal to each other within the atomic vapor chamber; and
   the probe light beam after interacting with the atoms is reflected by a third reflecting mirror and is divided by the polarizing beam splitter into two beams, and the two beams are detected by the photodetectors, respectively.

2. The physical unit of claim 1, wherein
   the reflecting mirrors disposed on the sides of the recess comprise: the first reflecting mirror, the second reflecting mirror, and the third reflecting mirror arranged on three sides of the recess, respectively; and
   the VCSEL is disposed on a laser base and the laser base is disposed on the glass sheet; and when in use
- the transmission beam of the first right angle prism passes through the quarter-wave plate whereby being converted into a circularly polarized beam; the circularly polarized beam is reflected by a second right angle prism onto the first reflecting mirror, and the circularly polarized beam after being reflected by the first reflecting mirror serves as the pump light beam;
- the reflection beam of the first right angle prism is reflected by a third right angle prism onto the second reflecting mirror, and a linearly polarized beam is reflected by the second reflecting mirror into the atomic vapor chamber as the probe light beam;
- the probe light beam after being orthogonal to the pump light beam is reflected by a third reflecting mirror into the polarizing beam splitter; and
- an incident light is divided by the polarizing beam splitter into two beams, one beam is detected by a first photodetector and the other beam is detected by a second photodetector.

3. The physical unit of claim 2, wherein
a convex lens is disposed between the VCSEL and the first right angle prism, and the VCSEL is disposed at a focus of the convex lens.

4. The physical unit of claim 1, wherein
an intensity of the transmission beam of the first right angle prism accounts for between 85% and 95% of an intensity of an incident light thereof.

5. The physical unit of claim 1, wherein
a diameter of the pump light beam corresponds with a depth of the recess; and
a diameter of the probe light beam corresponds with the depth of the recess.

6. The physical unit of claim 2, wherein
a polarization direction of the linearly polarized beam of the VCSEL is in parallel to the glass sheet;
an angle between an optical axis of the quarter-wave plate and a polarization direction of an incident light beam is 45°;
interior angles of the second right angle prism are 35.26°, 54.74°, and 90°, respectively;
interior angles of the third right angle prism are 35.26°, 54.74°, and 90°, respectively;
an angle between each of the three sides of the recess and the glass sheet is 54.74°; and
in both the second right angle prism and the third right angle prism, angles between reflection surfaces and the glass sheet are 35.26°, and angles between normal directions of the reflection surfaces and incident directions of incident light beams are 54.74°.

7. The physical unit of claim 1, wherein
the silicon sheet is a <100> crystallographic orientation silicon sheet, and the sides of the recess are obtained by anisotropic wet etching.

8. The physical unit of claim 2, wherein
the first reflecting mirror, the second reflecting mirror, and the third reflecting mirror are all single-layer metal reflecting films or multi-layer dielectric reflecting films.

9. The physical unit of claim 1, wherein
a surface of the silicon sheet is adhered to the glass sheet by anodic bonding process.

10. The physical unit of claim 2, wherein
an angle between the incident light of the polarizing beam splitter and a splitting surface of the polarizing beam splitter is 45°, and the two emergent beams after beam splitting are perpendicular to the first photodetector and the second photodetector, respectively.

* * * * *